JACOB T. KLOCK JR. INVENTOR.

BY William P. Jackson

ATTORNEY.

United States Patent Office 3,252,479
Patented May 24, 1966

3,252,479
APPARATUS FOR AUTOMATICALLY SHUTTING DOWN A FLUID DISTRIBUTION SYSTEM
Jacob T. Klock, Jr., Midland, Tex., assignor to Socony Mobil Oil Company, Inc., a corporation of New York
Filed June 14, 1963, Ser. No. 287,988
12 Claims. (Cl. 137—565)

This invention relates to the automatic shutting down of a fluid distribution system upon the occurrence of one or more of several conditions.

In fluid distribution systems it is often desirable to measure and record the volume of the fluid passing through the system and to obtain samples thereof. Obvious advantages are involved in carrying out these operations automatically rather than manually. Exemplary of automatic fluid distribution systems are LACT (Lease Automatic Custody Transfer) units, which normally include a pump for delivering oil to a pipeline and devices for measuring and for obtaining samples of the oil thus delivered. In a conventional LACT unit the sampling device is operated in conjunction with a positive displacement meter, for example, by means of a sampler actuating motor which is energized periodically in response to the flow rate through the meter. The LACT unit may also include a fail-safe system which will automatically shut down the unit upon failure of the positive displacement meter. While this will prevent transfer of unmeasured oil, a serious disadvantage of this system is that oil delivery will continue despite failure of the sampling device, thus resulting in delivery to the pipeline of oil from which samples have not been taken. It is therefore an object of this invention to provide fail-safe means for a fluid distribution system which will detect failure of not only a meter, but also a sampler, and which will shut down the system upon such failure.

In carrying out the invention, fail-safe provisions are made for a sampler which is adapted to obtain intermittently a sample of fluid from a distribution system, e.g., a LACT unit. If the sampler fails to operate, fluid flow through the system is terminated.

In a further aspect of the invention there is provided a counter means for recording the volume of fluid passing through a meter. When the counter means records a predetermined volume of fluid, fluid flow is terminated. The counter means is operated in conjunction with the sampler such that it will record only fluid from which samples have been taken. This assures that only sampled fluid is counted.

In a preferred embodiment of the invention there is provided a timer which acts to terminate fluid flow through a conduit upon the expiration of a predetermined time. Reset means are provided for resetting the timer to a reference time in response to the closing of an electric circuit which has connected therein a motor which actuates a sampler. The circuit is intermittently closed in response to fluid flow through the conduit by means operatively connected with the sampler and a meter in the conduit and thereafter opened by said means. The sampler is actuated by the motor during the time the circuit is closed. If, due to meter or sampler failure or a low flow rate, the circuit fails to close within the predetermined time, the timer will act to terminate fluid flow through the conduit.

A detailed description of the invention will now be made with reference to the drawings in which.

Figure 1:
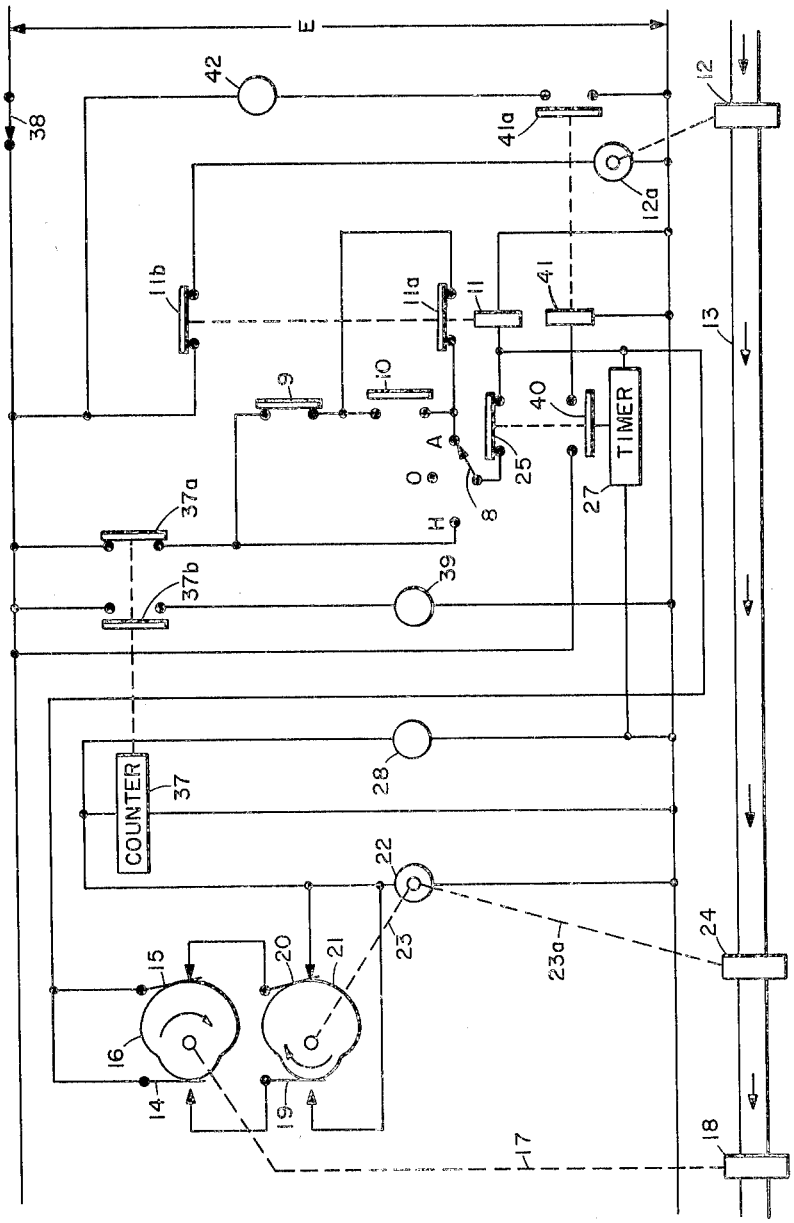
FIGURE 1 is a diagrammatic illustration of one form of the invention as applied in a LACT unit.

Referring to FIGURE 1, there is shown a LACT unit for delivering oil from a lease delivery tank to a pipeline. The LACT unit measures and records the delivered oil and intermittently takes samples thereof. Under normal conditions, the LACT unit will transfer oil until the monthly allowable for the lease is reached. However, should certain malfunctions occur, the LACT unit will automatically shut down.

More particularly, and as illustrated in FIGURE 1, the LACT unit includes a delivery pump 12 for delivery of oil from the delivery tank (not shown) through a conduit 13 to a pipeline junction (not shown). The delivery pump is driven by a shipping motor 12a which is connected across a voltage source E. A meter 18, e.g., a positive displacement meter, and a sampler 24 which includes an actuating motor 22 are provided in order, respectively, to measure and to obtain samples of the oil delivered to the pipeline.

The LACT unit also includes an electric control circuit which energizes the shipping motor when the delivery tank is full and de-energizes the motor when the oil level in the tank has dropped to a predetermined minimum. This circuit includes a master switch 38 and float controlled "low tank" and "high tank" level contacts 9 and 10, respectively. These contacts are closed when the oil in the delivery tank is above their corresponding levels and opened when the oil falls below these levels.

Assuming that master switch 38 is closed and that three-way switch 8 is in the A (automatic) position, contact 10 will close when the oil in the delivery tank reaches the high tank level. This will complete a circuit through a normally closed contact 37a, contacts 9 and 10, switch 8, a normally closed contact 25, and a LACT starter relay 11. Relay 11 will close contact 11a, thus maintaining the circuit closed after the oil in the tank falls below the high tank level and contact 10 opens. Simultaneously therewith, the relay will also close contact 11b, thus completing a circuit through the shipping motor 12a and energizing the same.

The control circuit also includes means for intermittently actuating sampler 24 in response to fluid flow through the positive displacement meter. In this respect, the circuit includes first contacts 14 and 15 which are alternately opened and closed by a cam 16 which is connected as indicated by broken line 17 to the meter. The cam movement is therefore responsive to fluid flow through the meter and the rotational velocity of cam 16 varies directly with the flow rate through the conduit. There are also provided second contacts 19 and 20 which are alternately opened and closed by rotational movement of a cam 21 which is driven by the sampler motor 22 through a connection indicated by broken line 23. Motor 22 actuates the sampler 24 through a connection indicated by broken line 23a.

A circuit is completed through the sampler actuating motor 22 when contacts 15 and 20 are closed. Cam 21 will be rotated when the motor is energized and after a few seconds the cam will rotate sufficiently to close contact 19 and open contact 20. This will open the circuit through contacts 15 and 20, thus de-energizing the sampler motor. Upon continued rotational movement of cam 16 in response to fluid flow through the meter, contact 15 will be opened and contact 14 closed, thus completing a second circuit through contacts 14 and 19 and the sampler motor will again be energized until contact 19 is opened by rotation of cam 21.

In accordance with the invention, fail-safe means are provided not only for the meter, but also for the sampler. The fail-safe means includes a contact 25 which is adapted to be opened by a timer 27 upon the expiration of a predetermined time. A reset clutch 28 which when energized will reset the timer to a reference time is connected in parallel with the sampler motor. Exemplary of a timer which may be used is one which will time out at a certain fixed point, but which may be reset to any starting point or reference time within a specified range. If such a timer is used, the above-described predetermined time will depend upon the reference time to which the timer is set. For example, if the timer will run out and open the switch at the zero mark, a reference time of fifteen minutes will of course result in a predetermined time of fifteen minutes. However, this may be reduced, for example, to ten minutes, by setting the timer back to a reference time of ten minutes. Upon closing of contacts 15 and 20 or 14 and 19, a circuit is completed through the reset clutch which is thus energized and sets the timer back to a reference time. The cam 21 and the associated circuit through the reset clutch thus act to generate an electric signal upon actuation of the sampler.

It is apparent that, upon failure of the sampler, cam 21 will remain stationary, thus preventing activation of the reset clutch within the predetermined time set into the timer. When the timer runs out, it will open contact 25, thus deenergizing the relay 11 which will then open contact 11b. This will terminate fluid flow through the conduit by de-energizing shipping motor 12a to render the delivery pump ineffective for pumping fluids through the conduit. The timer will also close a contact 40 when it runs out, thus energizing a relay 41. Relay 41 will close contact 41a and thus activate a visual alarm, beacon 42. Similarly, upon meter failure, the cam 16 will cease its rotational movement and the timer will ultimately run out and terminate fluid flow through conduit 13.

In a further aspect of the invention, the circuit includes a novel counter arrangement which will count only sampled oil and which will shut down the LACT unit when the monthly allowable for the lease is reached. This includes a lease allowable set stop counter 37 which records a unit volume, e.g., one barrel, of oil each time it is energized. The counter includes means for opening a normally closed contact 37a and closing a normally open contact 37b. When contact 37b is closed, an allowable made beacon 39 is activated. The monthly allowable in barrels is set into the counter and when it records this volume of oil, contact 37a is opened and contact 37b closed. As shown in FIGURE 1, the counter is connected in the control circuit in parallel with the sampler motor and is energized only when the motor is energized and a sample taken. The counter 37 will therefore record only sampled oil, thus assuring that the pipeline will not be charged for oil from which samples have not been obtained.

It will be recognized that the fail-safe means for the sampler and meter will also detect a predetermined low flow rate which is indicative of defects in the system, e.g., a defective pump. For example, if the timer is set for nine minutes and fifty-seven seconds and the sampler motor is energized for three seconds, it is apparent that contacts 14 and 15 must change position within ten minutes in order to prevent the timer running out. Assuming that the contacts change position once for each barrel of oil, the minimum flow rate will be one-tenth of a barrel per minute.

The embodiment of the invention shown in FIGURE 1 presents a marked improvement over the prior art. A preferred embodiment of the invention includes an additional feature which will invariably detect simultaneous failure of the meter and sampler, even though this occurs with the respective cams in positions closing the circuit.

Figure 2:
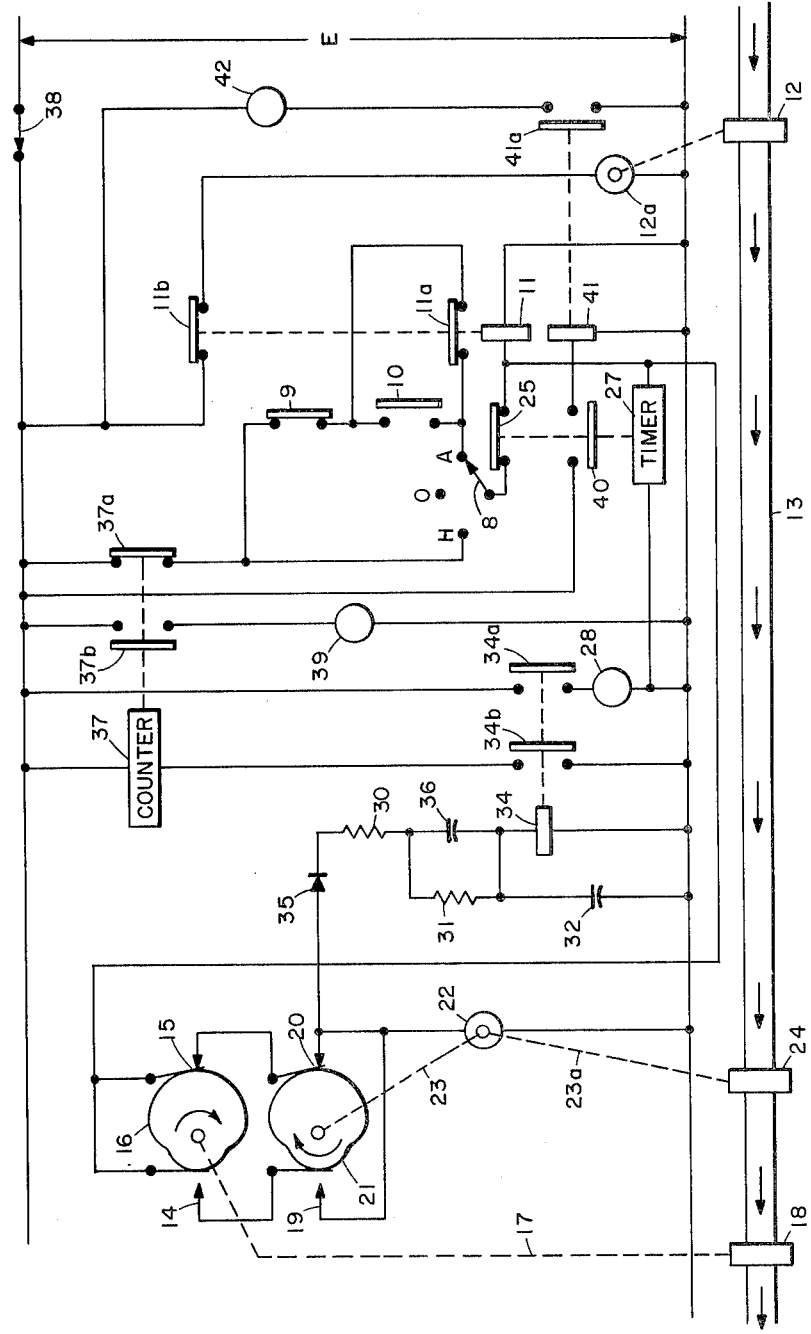
FIGURE 2 is a diagrammatic illustration of a modified form of the invention as applied in a LACT unit.

In order to detect such simultaneous failure of the meter and sampler, the control circuit of this preferred form of the invention is provided with a pulse relay circuit in parallel with the sampler motor. This modification, as applied in a LACT unit, is shown in FIGURE 2 in which like elements are designated by the reference numerals used in FIGURE 1. In the LACT unit of FIGURE 2, the resetting mechanism includes a pulse relay circuit which includes a rectifier 35, resistors 30 and 31, capacitors 32 and 36, and a relay 34 which closes a contact 34a in a reset clutch circuit. Since the pulse relay circuit per se is conventional, it will be described only briefly. When contacts 15 and 20 are first closed, a circuit will be completed through the sampler motor. Simultaneously therewith, current is supplied to the pulse relay circuit. Initially, of course, the charge on capacitor 36 will be zero and the current through relay 34 will be sufficient to cause it to pick up and close contact 34a, thus completing the reset circuit which includes reset clutch 28. The clutch 28 will then be energized and timer 27 will be reset. As capacitor 36 is charged, the current through the relay is decreased until it reaches a point at which the relay will release and open contact 34a. The capacitor 32 functions to delay the release by supplying additional current to the relay coil. The capacitance of capacitor 32 is relatively small as compared to that of capacitor 36 and it will initially charge and then begin to discharge when the current through the relay coil in the circuit decreases. As the capacitor 32 discharges, current will flow therefrom through the relay and delay its release time, thus delaying slightly the opening of contact 34a.

After the contact 34a is opened, it will not close again until the circuit through the sampler is opened and subsequently closed. Thus, if the meter and sampler motor both should fail with contacts 15 and 20 or 14 and 19 closed, the relay will subsequently open contact 34a when voltage across the relay drops below a predetermined level due to decrease of current flow therethrough and prevent continuous energization of the reset clutch. Timer 27 will therefore run out and contact 25 will be opened. This embodiment therefore provides a positive fail-safe arrangement which will invariably detect the failure of either or both the positive displacement meter and sampler motor.

As in the embodiment of FIGURE 1, the modification of FIGURE 2 also includes a system for shutting down the LACT unit when the monthly allowable for the lease is reached. This comprises a counter circuit including the lease allowable set stop counter 37 and a contact 34b which is controlled by relay 34 in the same manner as contact 34a. Contacts 37a and 37b are opened and closed respectively by the counter when it records the monthly allowable as in the embodiment of FIGURE 1.

The complete operation of the LACT unit shown in FIGURE 2 is as follows. Assuming that the monthly allowable has not been reached and the oil in the delivery tank is at the high tank level, the closing of switch 38 will energize sampler motor 22 and LACT start relay 11. The relay will close contact 11b and shipping motor 12a will be energized. The sampler motor will make a few revolutions after which contact 20 will be opened and contact 19 closed. After one barrel of oil has passed through the positive displacement meter, contact 14 will be closed and the sampler motor will again be energized. During the time the sampler motor is energized, a circuit is completed through the pulse relay circuit causing the relay 34 to pick up and close contacts 34b and 34a, thus energizing lease allowable set stop counter coil 37 and reset clutch 28, respectively. The counter 37 will record one barrel and reset clutch 28 will of course reset the timer back to a reference time. This cycle is repeated for every barrel of oil which passes through the meter.

If either the sampler motor or the meter should fail, the clutch 28 will not be energized and the timer will therefore open contact 25 upon the lapse of a predetermined time. This will de-energize relay 11 and contact 11b will open, thus deenergizing the shipping motor and stopping the delivery pump. Contact 11a will of course open simultaneously with contact 11b and the control circuit will be de-energized. As in the embodiment of FIGURE 1, the timer 27 will also run out and open contact 25 if the flow rate falls below a certain minimum level.

Assuming that the flow rate stays above the minimum and that there are no malfunctions of the sampler and meter, the delivery pump will run until counter 37 records the monthly allowable for the lease. The counter is coupled to contact 37a as described above and when the allowable is reached, contact 37a will be opened, thus de-energizing the shipping motor and shutting down the delivery pump.

In the described embodiments of the invention, the meter may be of the positive displacement type which is commercially available from the A. O. Smith Co., Los Angeles, California, and identified as their Model No. S13.

A suitable sampler, including the motor, is available from the Maintenance-Mechanical Corporation, Houston, Texas, and identified as their Model No. HB–3V.

The counter 37 may be of the electrically driven type available from the Presin Co., Bridgeport, Connecticut, as their Model No. F185.

The reset clutch and timer may be obtained from the Eagle Signal Co., Moline, Illinois, as a single unit which is identified as their Model No. HP52A601.

In the embodiment of FIGURE 2, which is now in use, the resistances of resistors 30 and 31 are 50 and 82,000 ohms, respectively; and capacitors 32 and 36 have capacitances of 4 and 20 microfarads, respectively.

Having described specific embodiments of the invention, it is understood that further modifications may be suggested to those skilled in the art, and it is intended to cover all such modifications as fall within the scope of the appended claims.

I claim:

1. A fluid distribution system comprising a conduit, means in fluid communication with said conduit for pumping fluids therethrough, a fluid-flow meter in said conduit, means in fluid communication with said conduit for taking a sample of fluid therefrom, means interconnecting said meter with said sample taking means for intermittent actuation of the sample taking means in response to fluid flow through said meter, and means responsive to failure of either of said meter and said sample taking means for rendering said first named means ineffective for pumping fluids through said conduit.

2. A fluid distribution system comprising a conduit for transferring fluid, a fluid-flow meter in said conduit and means for counting unit volumes of fluid measured by said meter, means for intermittently taking a sample of fluid from said conduit, and means responsive to the failure of said sampling means for rendering said first named means ineffective for counting fluid measured by said meter.

3. A fluid distribution system comprising a conduit for transferring fluid, a fluid-flow meter in said conduit, means in fluid communication with said conduit for taking a sample of fluid therefrom, means interconnecting said meter with said sample taking means for intermittent actuation of the sample taking means in response to fluid flow through said meter, timing means for terminating fluid flow through said conduit upon the expiration of a predetermined time, and reset means responsive to actuation of said sample taking means for resetting said timing means to a reference time when said sample taking means is actuated.

4. A fluid distribution system comprising a conduit for transferring fluid, means in fluid communication with said conduit for intermittently taking a sample of fluid therefrom, an electric circuit and means operatively connected with said sample taking means for closing said circuit when a sample is taken and thereafter opening said circuit, timing means for terminating fluid flow through said conduit upon the expiration of a predetermined time, and reset means in said circuit for resetting said timing means to a reference time each time the circuit is closed.

5. A fluid distribution system comprising a conduit for transferring fluid, a fluid-flow meter in said conduit, first and second electric circuits each having at least two contacts therein and means operatively connected with said meter for successively closing and opening first of said contacts in each of said circuits in response to fluid flow through said conduit, a fluid sampler in fluid communication with said conduit and a sampler actuating motor connected in said circuits whereby said motor is energized and a sample taken when one of said circuits is closed, means operatively connected with said sampler for opening a second contact in said one of said circuits and closing a second contact in the other of said circuits after a sample is taken but before the first contact in the other of said circuits is closed, timer means for terminating fluid flow through said conduit upon the expiration of a predetermined time, and reset means in said circuits for resetting said timer to a reference time when the first and second contacts of one of said circuits are closed.

6. A fluid distribution system comprising a conduit for transferring fluid, a meter and a sampler in fluid communication with said conduit, an electric control circuit and a sampler actuating motor in said circuit whereby said motor is energized and a sample taken when said circuit is closed, means operatively connected with said meter and sampler for closing said circuit in response to fluid flow through said conduit and subsequently opening said circuit after said sampler has been actuated and a sample taken, and means responsive to the failure of said circuit closing within a predetermined time or opening within a predetermined time for terminating fluid flow through said conduit.

7. The combination of claim 6 wherein said last named means includes timer means for terminating fluid flow through said conduit upon the expiration of a predetermined time, a normally open reset circuit, means in said reset circuit for resetting said timer means to a reference time when said circuit is closed, and means in said control circuit for closing said reset circuit when said control circuit is closed and for opening said reset circuit when said control circuit remains closed for a predetermined time.

8. A fluid distribution system comprising a conduit for transferring fluid, a fluid-flow meter in said conduit, first and second electric circuits and means operatively connected with said meter for successively closing each of said circuits in response to fluid flow through said conduit, a fluid sampler in fluid communication with said conduit and a sampler actuating motor connected in said circuits whereby said motor is energized and a sample taken when one of said circuits is closed, means operatively connected with said sampler for opening said one of said circuits after a sample is taken but before the other of said circuits is closed by said means operatively connected with said meter, timing means for terminating fluid flow through said conduit upon the expiration of a predetermined time, reset means for resetting said timing means to a reference time upon the closing of one of said circuits, and means for rendering said reset means ineffective for resetting said timing means upon the circuit remaining closed for a predetermined time.

9. In an automatic fluid transfer system, a conduit for transferring fluid, a meter and a sampler in fluid communication with said conduit, an electric circuit and a sampler actuating motor in said circuit whereby said motor is energized and a sample taken when said circuit is closed, means operatively connected with said meter and sampler for closing said circuit in response to fluid flow through said conduit and subsequently opening said circuit after said sampler has been actuated and a sample taken, counter means for recording a unit volume of fluid each time said circuit is closed, said counter means including means for terminating fluid flow through said conduit upon said counter means recording a predetermined volume of fluid, and means responsive to the failure of said circuit closing within a predetermined time for terminating fluid flow through said conduit.

10. A fluid distribution system comprising a conduit for transferring fluid, means in fluid communication with said conduit for intermittently taking a sample of fluid therefrom, timing means for terminating fluid flow through said conduit after the expiration of a predetermined time, and reset means responsive to actuation of said sample taking means for resetting said timing means to a reference time.

11. A fluid distribution system comprising a conduit for transferring fluid, means in fluid communication with said conduit for intermittently taking a sample of fluid therefrom, signal means operatively connected with said sample taking means for generating a signal dependent upon actuation of said sample taking means, and means responsive to the failure of said signal means generating a signal within a predetermined time for terminating fluid flow through said conduit.

12. A fluid distribution system comprising a fluid carrying conduit, means in fluid communication with said conduit for intermittently taking a sample therefrom, means in said conduit for metering fluid flow therethrough, and means responsive to failure of either of said sample taking means and said metering means for terminating fluid flow through said conduit.

References Cited by the Examiner
UNITED STATES PATENTS

| | | | |
|---|---|---|---|
| 2,736,201 | 2/1956 | Ohlsen | 73—198 X |
| 2,995,931 | 8/1961 | Perry | 73—198 |

M. CARY NELSON, *Primary Examiner.*

W. R. CLINE, *Assistant Examiner.*